US012284475B2

(12) United States Patent
Trainer et al.

(10) Patent No.: US 12,284,475 B2
(45) **Date of Patent: *Apr. 22, 2025**

(54) IN-EAR HEADPHONE

(71) Applicant: APPLE INC., Cupertino, CA (US)

(72) Inventors: Glenn K. Trainer, Santa Clara, CA (US); Scott C. Grinker, Belmont, CA (US); Ethan L. Huwe, Davis, CA (US); Craig M. Stanley, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,155

(22) Filed: Jan. 29, 2024

(65) Prior Publication Data

US 2024/0171891 A1 May 23, 2024

Related U.S. Application Data

(63) Continuation of application No. 17/648,418, filed on Jan. 19, 2022, now Pat. No. 11,930,313, which is a (Continued)

(51) Int. Cl.
*H04R 1/26* (2006.01)
*G10K 11/178* (2006.01)
(Continued)

(52) U.S. Cl.
CPC ......... *H04R 1/1016* (2013.01); *G10K 11/178* (2013.01); *G10K 11/17857* (2018.01);
(Continued)

(58) Field of Classification Search
CPC .. H04R 1/1016; H04R 1/1066; H04R 1/1075; H04R 1/1083; H04R 5/033; H04R 5/04;
(Continued)

(56) References Cited

U.S. PATENT DOCUMENTS 4,509,201 A 4/1985 Sekigawa et al.
4,637,022 A 1/1987 Burke et al.
(Continued)

FOREIGN PATENT DOCUMENTS

AU 2008203892 7/2008
AU 2008239811 10/2008
(Continued)

OTHER PUBLICATIONS

Article entitled, "Akono Headset HBH-660/HBH-662 User Guide", Sony Ericsson, Available online at: http://phone.manualsonline.com/manuals/mfg/sony_ericsson_mobile_communications/sony_ericsson_bluetooth_akono_hbh_hbh660.html, 2004 in 35 pages (of-record in the parent application).

(Continued)

*Primary Examiner* — Suhan Ni

(74) *Attorney, Agent, or Firm* — Kilpatrick Townsend & Stockton LLP

(57) ABSTRACT

A low-profile earbud is disclosed that sits securely within an ear of a user. The earbud includes a protruding portion that passes through a channel defined by the tragus and anti-tragus of the ear. In some embodiments, the protruding portion can take the form of a cable configured to supply power and transfer data to the earbud. In some embodiments, the protruding portion can provide additional space for electrical components and sensors supporting the earbud.

20 Claims, 6 Drawing Sheets

Related U.S. Application Data continuation of application No. 17/069,599, filed on Oct. 13, 2020, now Pat. No. 11,265,638, which is a continuation of application No. 16/883,031, filed on May 26, 2020, now Pat. No. 10,841,683, which is a continuation of application No. 16/748,464, filed on Jan. 21, 2020, now Pat. No. 10,694,276, which is a continuation of application No. 15/169,563, filed on May 31, 2016, now Pat. No. 10,582,284.

(60) Provisional application No. 62/235,348, filed on Sep. 30, 2015.

(51) Int. Cl.
*H04R 1/10* (2006.01)
*H04R 5/033* (2006.01)
*H04R 5/04* (2006.01)
*H04R 11/02* (2006.01)

(52) U.S. Cl.
CPC .................. *G10K 11/17873* (2018.01); *G10K 2210/1081* (2013.01); *G10K 2210/3219* (2013.01); *H04R 1/1066* (2013.01); *H04R 1/1075* (2013.01); *H04R 1/1083* (2013.01); *H04R 1/26* (2013.01); *H04R 5/033* (2013.01); *H04R 5/04* (2013.01); *H04R 11/02* (2013.01); *H04R 2201/103* (2013.01); *H04R 2201/107* (2013.01); *H04R 2205/022* (2013.01); *H04R 2420/07* (2013.01); *H04R 2420/09* (2013.01); *H04R 2460/01* (2013.01)

(58) Field of Classification Search
CPC .............. H04R 11/02; H04R 2201/103; H04R 2201/107; H04R 2205/022; H04R 2420/07; H04R 2420/09; H04R 2460/01
See application file for complete search history.

(56) References Cited

U.S. PATENT DOCUMENTS

| | | | |
|---|---|---|---|
| 4,845,419 | A | 7/1989 | Hacker |
| 4,882,745 | A | 11/1989 | Silver |
| 4,890,329 | A | 12/1989 | Erbe |
| 5,245,269 | A | 9/1993 | Tooley et al. |
| D345,141 | S | 3/1994 | Lucey et al. |
| 5,385,478 | A | 1/1995 | Niekawa |
| 5,448,646 | A | 9/1995 | Lucey et al. |
| 5,455,859 | A | 10/1995 | Gutzmer |
| 5,492,489 | A | 2/1996 | Chavakula |
| 5,504,812 | A | 4/1996 | Vangarde |
| 5,812,356 | A | 9/1998 | O'Connor |
| 5,832,093 | A | 11/1998 | Bernstein et al. |
| 5,836,790 | A | 11/1998 | Barnett |
| 5,894,752 | A | 4/1999 | Yano et al. |
| 5,949,896 | A | 9/1999 | Nageno et al. |
| 6,051,964 | A | 4/2000 | Brown et al. |
| 6,078,825 | A | 6/2000 | Hahn et al. |
| 6,129,559 | A | 10/2000 | Hirata et al. |
| 6,219,215 | B1 | 4/2001 | Bertin et al. |
| 6,253,871 | B1 | 7/2001 | Aceti |
| 6,267,602 | B1 | 7/2001 | Mendelson et al. |
| 6,447,399 | B1 | 9/2002 | Denham |
| 6,456,720 | B1 | 9/2002 | Brimhall et al. |
| 6,464,509 | B1 | 10/2002 | Emberty et al. |
| 6,474,999 | B1 | 11/2002 | Givens et al. |
| 6,542,614 | B2 | 4/2003 | Renner |
| 6,744,236 | B2 | 6/2004 | Capel et al. |
| 6,771,790 | B2 | 8/2004 | Liu |
| 6,796,849 | B2 | 9/2004 | Villain |
| 6,819,762 | B2 | 11/2004 | Jones et al. |
| 6,942,906 | B2 | 9/2005 | Sakata et al. |
| 7,094,086 | B2 | 8/2006 | Teicher |
| 7,128,456 | B2 | 10/2006 | Yamashita et al. |
| 7,133,708 | B2 | 11/2006 | Park et al. |
| 7,246,750 | B2 | 7/2007 | Cho |
| 7,289,640 | B2 | 10/2007 | Tsai et al. |
| 7,311,526 | B2 | 12/2007 | Rohrbach et al. |
| 7,351,066 | B2 | 4/2008 | DiFonzo et al. |
| 7,354,315 | B2 | 4/2008 | Goetz et al. |
| 7,443,759 | B1 | 10/2008 | Rowlands et al. |
| 7,496,671 | B2 | 2/2009 | Engel et al. |
| 7,517,222 | B2 | 4/2009 | Rohrbach et al. |
| 7,589,536 | B2 | 9/2009 | Terlizzi et al. |
| 7,626,643 | B2 | 12/2009 | Ijzerman et al. |
| 7,641,477 | B2 | 1/2010 | DiFonzo et al. |
| 7,645,143 | B2 | 1/2010 | Rohrbach et al. |
| 7,798,831 | B2 | 9/2010 | Sanford et al. |
| 7,859,134 | B2 | 12/2010 | Chi et al. |
| 7,863,906 | B2 | 1/2011 | Terlizzi et al. |
| 7,875,996 | B2 | 1/2011 | Nguyen et al. |
| 7,880,131 | B2 | 2/2011 | Andre et al. |
| 7,884,315 | B2 | 2/2011 | Andre et al. |
| 7,888,943 | B2 | 2/2011 | Nguyen |
| 7,949,802 | B2 | 5/2011 | Gallant et al. |
| 7,966,511 | B2 | 6/2011 | Naveh et al. |
| 8,086,281 | B2 | 12/2011 | Rabu et al. |
| 8,180,093 | B2 | 5/2012 | Hankey et al. |
| 8,185,084 | B2 | 5/2012 | Terlizzi |
| 8,189,846 | B2 | 5/2012 | Tiscareno et al. |
| 8,311,255 | B2 | 11/2012 | Hankey et al. |
| 8,311,259 | B2 | 11/2012 | Pinter et al. |
| 8,401,219 | B2 | 3/2013 | Hankey et al. |
| 8,553,923 | B2 | 10/2013 | Tiscareno et al. |
| 8,650,925 | B2 | 2/2014 | Hankey et al. |
| 8,660,289 | B2 | 2/2014 | Tiscareno et al. |
| 8,712,071 | B2 | 4/2014 | Terlizzi et al. |
| 8,737,664 | B2 | 5/2014 | Tiscareno et al. |
| 8,774,444 | B2 | 7/2014 | Tiscareno et al. |
| 8,867,748 | B2 | 10/2014 | Posa |
| 8,867,758 | B2 | 10/2014 | Terlizzi et al. |
| 8,971,561 | B2 | 3/2015 | Howes et al. |
| 8,976,994 | B2 | 3/2015 | Howes et al. |
| 9,118,990 | B2 | 8/2015 | Hankey et al. |
| 9,161,118 | B2 | 10/2015 | Howes et al. |
| 9,210,496 | B2 | 12/2015 | Howes et al. |
| 9,287,657 | B2 | 3/2016 | Hankey et al. |
| 9,294,830 | B2 | 3/2016 | Terlizzi |
| 9,467,761 | B2 | 10/2016 | Grinker et al. |
| 9,510,077 | B2 | 11/2016 | Howes et al. |
| 9,510,086 | B2 | 11/2016 | Howes et al. |
| 9,781,506 | B2 | 10/2017 | Howes et al. |
| 9,854,343 | B2 | 12/2017 | Hankey et al. |
| 9,866,945 | B2 | 1/2018 | McAuliffe et al. |
| 9,936,284 | B2 | 4/2018 | Howes et al. |
| 9,967,646 | B2 | 5/2018 | Hankey et al. |
| 10,110,984 | B2 | 10/2018 | Rich et al. |
| 10,356,510 | B2 | 7/2019 | Howes et al. |
| 10,567,861 | B2 | 2/2020 | Rich et al. |
| 10,582,284 | B2 | 3/2020 | Trainer et al. |
| 10,694,276 | B2 | 6/2020 | Trainer et al. |
| 10,694,282 | B2 | 6/2020 | Howes et al. |
| 10,841,683 | B2 | 11/2020 | Trainer et al. |
| 11,265,638 | B2 | 3/2022 | Trainer et al. |
| 2002/0028701 | A1 | 3/2002 | Satoh et al. |
| 2002/0030589 | A1 | 3/2002 | Tabata et al. |
| 2002/0054686 | A1 | 5/2002 | Tabata et al. |
| 2002/0063690 | A1 | 5/2002 | Chung et al. |
| 2002/0090931 | A1 | 7/2002 | Papineau et al. |
| 2002/0131585 | A1 | 9/2002 | Jones et al. |
| 2002/0155754 | A1 | 10/2002 | De'Longhi |
| 2002/0159228 | A1 | 10/2002 | Emberty et al. |
| 2003/0006650 | A1 | 1/2003 | Tang et al. |
| 2003/0038616 | A1 | 2/2003 | Capel et al. |
| 2003/0134591 | A1 | 7/2003 | Roberts, Jr. et al. |
| 2003/0137286 | A1 | 7/2003 | Kimball et al. |
| 2003/0139156 | A1 | 7/2003 | Satoh et al. |
| 2003/0139207 | A1 | 7/2003 | Yamazaki |
| 2003/0157972 | A1 | 8/2003 | Bae |
| 2003/0211871 | A1 | 11/2003 | Nassimi |
| 2003/0217246 | A1 | 11/2003 | Kubota et al. |
| 2004/0023560 | A1 | 2/2004 | Swoboda |

(56) References Cited

U.S. PATENT DOCUMENTS

| | | | |
|---|---|---|---|
| 2004/0101244 | A1 | 5/2004 | Archer |
| 2004/0121793 | A1 | 6/2004 | Weigele et al. |
| 2004/0131220 | A1 | 7/2004 | Liu |
| 2004/0136155 | A1 | 7/2004 | Onishi et al. |
| 2004/0209489 | A1 | 10/2004 | Clapper |
| 2004/0232248 | A1 | 11/2004 | Cho |
| 2005/0030622 | A1 | 2/2005 | Morita et al. |
| 2005/0130593 | A1 | 6/2005 | Michalak |
| 2005/0145004 | A1 | 7/2005 | Vescovini |
| 2005/0148374 | A1 | 7/2005 | Lin |
| 2005/0200331 | A1 | 9/2005 | Patino et al. |
| 2005/0202727 | A1 | 9/2005 | Andre et al. |
| 2005/0233768 | A1 | 10/2005 | Guo et al. |
| 2005/0239261 | A1 | 10/2005 | Tai et al. |
| 2005/0261563 | A1 | 11/2005 | Zhou et al. |
| 2005/0268134 | A1 | 12/2005 | Park |
| 2005/0289375 | A1 | 12/2005 | Ranganathan et al. |
| 2006/0026447 | A1 | 2/2006 | Naveh et al. |
| 2006/0034477 | A1 | 2/2006 | Lazzeroni et al. |
| 2006/0045303 | A1 | 3/2006 | Akino |
| 2006/0147078 | A1 | 7/2006 | Neu et al. |
| 2006/0166715 | A1 | 7/2006 | Van Engelen et al. |
| 2006/0211871 | A1 | 9/2006 | Dai et al. |
| 2006/0227531 | A1 | 10/2006 | Iou |
| 2006/0227532 | A1 | 10/2006 | Ko et al. |
| 2006/0234780 | A1 | 10/2006 | Ramsden et al. |
| 2006/0235873 | A1 | 10/2006 | Thomas |
| 2006/0252284 | A1 | 11/2006 | Marmaropoulos et al. |
| 2006/0268528 | A1 | 11/2006 | Zadesky et al. |
| 2007/0072443 | A1 | 3/2007 | Rohrbach et al. |
| 2007/0121974 | A1 | 5/2007 | Nemirovski |
| 2007/0123296 | A1 | 5/2007 | Chen |
| 2007/0132436 | A1 | 6/2007 | Westwick et al. |
| 2007/0133836 | A1 | 6/2007 | Lee |
| 2007/0178771 | A1 | 8/2007 | Goetz et al. |
| 2007/0280182 | A1 | 12/2007 | Wisherd et al. |
| 2008/0024470 | A1 | 1/2008 | Andre et al. |
| 2008/0033273 | A1 | 2/2008 | Zhou et al. |
| 2008/0054721 | A1 | 3/2008 | Frew et al. |
| 2008/0074084 | A1 | 3/2008 | Lee et al. |
| 2008/0084404 | A1 | 4/2008 | Andre et al. |
| 2008/0140887 | A1 | 6/2008 | Gallant et al. |
| 2008/0163663 | A1 | 7/2008 | Hankey et al. |
| 2008/0164770 | A1 | 7/2008 | Terlizzi |
| 2008/0164825 | A1 | 7/2008 | Terlizzi et al. |
| 2008/0164934 | A1 | 7/2008 | Hankey et al. |
| 2008/0165982 | A1 | 7/2008 | Hankey et al. |
| 2008/0166001 | A1 | 7/2008 | Hankey et al. |
| 2008/0166004 | A1 | 7/2008 | Sanford et al. |
| 2008/0166005 | A1 | 7/2008 | Terlizzi et al. |
| 2008/0166006 | A1 | 7/2008 | Hankey et al. |
| 2008/0166007 | A1 | 7/2008 | Hankey et al. |
| 2008/0166907 | A1 | 7/2008 | Sanford et al. |
| 2008/0166968 | A1 | 7/2008 | Tang et al. |
| 2008/0167088 | A1 | 7/2008 | Rabu et al. |
| 2008/0219486 | A1 | 9/2008 | Goldstein et al. |
| 2008/0234780 | A1 | 9/2008 | Smith et al. |
| 2008/0319562 | A1 | 12/2008 | Forstall |
| 2009/0041284 | A1 | 2/2009 | Tanaka et al. |
| 2009/0092269 | A1 | 4/2009 | Nielsen et al. |
| 2009/0160256 | A1 | 6/2009 | Nguyen et al. |
| 2009/0160421 | A1 | 6/2009 | Nguyen et al. |
| 2009/0164035 | A1 | 6/2009 | Zadesky et al. |
| 2009/0164807 | A1 | 6/2009 | Chi et al. |
| 2009/0267613 | A1 | 10/2009 | Terlizzi et al. |
| 2009/0273315 | A1 | 11/2009 | Nguyen |
| 2009/0302826 | A1 | 12/2009 | Kim et al. |
| 2010/0278364 | A1 | 11/2010 | Berg |
| 2011/0058702 | A1 | 3/2011 | Saggio, Jr. |
| 2011/0158440 | A1 | 6/2011 | Mei et al. |
| 2011/0299713 | A1 | 12/2011 | Moeller et al. |
| 2012/0057718 | A1 | 3/2012 | Vernon |
| 2012/0212063 | A1 | 8/2012 | Terlizzi |
| 2012/0224710 | A1 | 9/2012 | Terlizzi et al. |
| 2013/0051589 | A1 | 2/2013 | Ide et al. |
| 2013/0217246 | A1 | 8/2013 | Hankey et al. |
| 2015/0010193 | A1 | 1/2015 | Burgett et al. |
| 2015/0245129 | A1 | 8/2015 | Dusan et al. |
| 2016/0073188 | A1 | 3/2016 | Lindén et al. |
| 2017/0048604 | A1 | 2/2017 | Hankey et al. |
| 2017/0064427 | A1 | 3/2017 | Rich et al. |
| 2017/0093079 | A1 | 3/2017 | Wagman et al. |
| 2017/0094386 | A1 | 3/2017 | Trainer et al. |
| 2017/0245040 | A1 | 8/2017 | Hankey et al. |
| 2018/0005622 | A1 | 1/2018 | Kyllönen et al. |
| 2018/0242068 | A1 | 8/2018 | Kelley et al. |
| 2020/0162806 | A1 | 5/2020 | Trainer et al. |
| 2020/0288230 | A1 | 9/2020 | Trainer et al. |
| 2021/0029438 | A1 | 1/2021 | Trainer et al. |
| 2022/0141566 | A1 | 5/2022 | Trainer et al. |

FOREIGN PATENT DOCUMENTS

| | | |
|---|---|---|
| CN | 1231791 | 10/1999 |
| CN | 2511075 | 9/2002 |
| CN | 2524386 | 12/2002 |
| CN | 1471201 | 1/2004 |
| CN | 2646960 | 10/2004 |
| CN | 1625189 | 6/2005 |
| CN | 2731880 | 10/2005 |
| CN | 1725574 | 1/2006 |
| CN | 1742476 | 3/2006 |
| CN | 2762470 | 3/2006 |
| CN | 2836386 | 11/2006 |
| CN | 2847589 | 12/2006 |
| CN | 201207720 | 3/2009 |
| CN | 201238367 | 5/2009 |
| CN | 201243371 | 5/2009 |
| CN | 201252631 | 6/2009 |
| CN | 201263208 | 6/2009 |
| CN | 201267005 | 7/2009 |
| CN | 201336721 | 10/2009 |
| CN | 201365327 | 12/2009 |
| CN | 201365328 | 12/2009 |
| CN | 201365329 | 12/2009 |
| CN | 201383860 | 1/2010 |
| CN | 101689717 | 3/2010 |
| CN | 490408 | 5/2010 |
| CN | 201478543 | 5/2010 |
| CN | 101809826 | 8/2010 |
| CN | 201540996 | 8/2010 |
| CN | 102547514 | 7/2012 |
| CN | 102738652 | 10/2012 |
| CN | 104202689 | 12/2014 |
| CN | 104362448 | 2/2015 |
| DE | 10333403 | 9/2004 |
| DE | 202004012084 | 10/2004 |
| DE | 202004009938 | 11/2004 |
| DE | 202008018654 | 8/2017 |
| EP | 0840396 | 5/1998 |
| EP | 0918357 | 5/1999 |
| EP | 1109147 | 6/2001 |
| EP | 1469671 | 10/2004 |
| EP | 1631044 | 3/2006 |
| EP | 1791335 | 5/2007 |
| EP | 2104967 | 9/2009 |
| EP | 2119197 | 11/2009 |
| EP | 2127033 | 12/2009 |
| EP | 2421101 | 2/2012 |
| EP | 2421115 | 2/2012 |
| EP | 2426825 | 3/2012 |
| EP | 2418740 | 6/2013 |
| EP | 1346483 | 8/2013 |
| EP | 2640170 | 9/2013 |
| EP | 2650611 | 10/2013 |
| EP | 2654214 | 10/2013 |
| EP | 2654270 | 10/2013 |
| EP | 3196551 | 7/2017 |
| GB | 2326062 | 12/1998 |
| HK | 1134716 | 1/2013 |
| HK | 1136423 | 3/2013 |
| HK | 1136698 | 3/2013 |
| IN | 2569KOLNP2009 | 12/2009 |
| IN | 273757 | 6/2016 |

(56) References Cited

FOREIGN PATENT DOCUMENTS

| | | |
|---|---|---|
| JP | 2006041787 | 2/2006 |
| JP | 2006229545 | 8/2006 |
| JP | 2006293565 | 10/2006 |
| JP | 2010516096 | 5/2010 |
| JP | 2012054974 | 3/2012 |
| JP | 4975111 | 7/2012 |
| JP | 5242754 | 7/2013 |
| JP | 2013153530 | 8/2013 |
| JP | 5638103 | 12/2014 |
| KR | 20090108620 | 10/2009 |
| KR | 101113562 | 4/2012 |
| TW | 289802 | 11/1996 |
| TW | 499137 | 8/2002 |
| TW | 501326 | 9/2002 |
| TW | 522703 | 3/2003 |
| TW | 557065 | 10/2003 |
| TW | M248071 | 10/2004 |
| TW | M260974 | 4/2005 |
| TW | 200522720 | 7/2005 |
| TW | I242994 | 11/2005 |
| TW | M283425 | 12/2005 |
| TW | M293625 | 7/2006 |
| TW | M294173 | 7/2006 |
| TW | I260939 | 8/2006 |
| TW | 200843256 | 11/2008 |
| TW | 200847830 | 12/2008 |
| TW | 200849303 | 12/2008 |
| TW | 200849847 | 12/2008 |
| TW | 200849937 | 12/2008 |
| TW | 200850035 | 12/2008 |
| TW | 200850036 | 12/2008 |
| TW | 201218237 | 5/2012 |
| TW | I364887 | 5/2012 |
| TW | I371898 | 9/2012 |
| TW | 201242211 | 10/2012 |
| TW | I393360 | 4/2013 |
| TW | I433524 | 4/2014 |
| TW | I435616 | 4/2014 |
| TW | I457964 | 10/2014 |
| TW | I462597 | 11/2014 |
| TW | I483625 | 5/2015 |
| TW | 201631859 | 9/2016 |
| TW | I548176 | 9/2016 |
| WO | 97016116 | 5/1997 |
| WO | 9813981 | 4/1998 |
| WO | 01043497 | 6/2001 |
| WO | 0178354 | 10/2001 |
| WO | 0186923 | 11/2001 |
| WO | 03090321 | 10/2003 |
| WO | 2004034756 | 4/2004 |
| WO | 2006013553 | 2/2006 |
| WO | 2006074369 | 7/2006 |
| WO | 2006099044 | 9/2006 |
| WO | 2006103269 | 10/2006 |
| WO | 2006113042 | 10/2006 |
| WO | 2006126881 | 11/2006 |
| WO | 2008085862 | 7/2008 |
| WO | 2008085863 | 7/2008 |
| WO | 2008085864 | 7/2008 |
| WO | 2008085866 | 7/2008 |
| WO | 2008085873 | 7/2008 |
| WO | 2008127488 | 10/2008 |
| WO | 2008130456 | 10/2008 |

OTHER PUBLICATIONS

Article entitled, "MacBook Pro User's Guide", Available online at : http://manuals.info.apple.com/en/macbook_pro_users_quide.pdf, 2006 in 139 pages (of-record in the parent application).

Non-Final Office Action issued in U.S. Appl. No. 11/823,922, dated Oct. 20, 2011 in 13 pages (of-record in the parent application).

Notice of Allowance issued in U.S. Appl. No. 11/823,922, dated Jul. 3, 2012 in 7 pages (of-record in the parent application).

Notice of Allowance issued in U.S. Appl. No. 11/823,922, dated May 22, 2012 in 7 pages (of-record in the parent application).

Non-Final Office Action issued in U.S. Appl. No. 11/824,180, dated Jun. 27, 2011 in 14 pages (of-record in the parent application).

Notice of Allowance issued in U.S. Appl. No. 11/824,180, dated Jan. 12, 2012 in 7 pages (of-record in the parent application).

Final Office Action issued in U.S. Appl. No. 11/824,203, dated Jan. 14, 2014 in 18 pages (of-record in the parent).

Final Office Action issued in U.S. Appl. No. 11/824,203, dated Dec. 16, 2014 in 20 pages (of-record in the parent application).

Final Office Action issued in U.S. Appl. No. 11/824,203, dated Feb. 16, 2012 in 31 pages (of-record in the parent application).

Non-Final Office Action issued in U. S. U.S. Appl. No. 11/824,203, dated Jun. 14, 2013 in 17 pages (of-record in the parent application).

Non-Final Office Action issued in U.S. Appl. No. 11/824,203, dated Jul. 8, 2011 in 18 pages (of-record in the parent application).

Non-Final Office Action issued in U.S. Appl. No. 11/824,203, dated Jun. 18, 2014 in 20 pages (of-record in the parent application).

Notice of Allowance in U.S. Appl. No. 11/824,203, dated Mar. 6, 2015 in 5 pages (of-record in the parent application).

Final Office Action issued in U.S. Appl. No. 11/824,442, dated Sep. 2, 2010 in 10 pages (of-record in the parent application).

Final Office Action issued in U.S. Appl. No. 11/824,442, dated Nov. 26, 2012 in 13 pages (of-record in the parent application).

Non-Final Office Action issued in U.S. Appl. No. 11/824,442, dated Apr. 25, 2012 in 14 pages (of-record in the parent application).

Non-Final Office Action issued in U.S. Appl. No. 11/824,442, dated Mar. 8, 2010 in 7 pages (of-record in the parent application).

Notice of Allowance issued in U.S. Appl. No. 11/824,442, dated Jun. 28, 2013 in 8 pages (of-record in the parent application).

Notice of Allowance issued in U.S. Appl. No. 11/824,442, dated Oct. 4, 2013 in 8 pages (of-record in the parent application).

Restriction Requirement issued in U.S. Appl. No. 11/824,442, dated Oct. 8, 2009 in 6 pages (of-record in the parent application).

Final Office Action issued in U.S. Appl. No. 11/824,443, dated Jan. 17, 2012 in 20 pages (of-record in the parent application).

Final Office Action issued in U.S. Appl. No. 11/824,443, dated Jun. 17, 2013 in 24 pages (of-record in the parent application).

Non-Final Office Action issued in U.S. Appl. No. 11/824,443, dated Jun. 9, 2011 in 16 pages (of-record in the parent application).

Non-Final Office Action issued in U.S. Appl. No. 11/824,443, dated Sep. 10, 2012 in 21 pages (of-record in the parent application).

Notice of Allowance issued in U.S. Appl. No. 11/824,443, dated Nov. 20, 2013 in 11 pages (of-record in the parent application).

Final Office Action issued in U.S. Appl. No. 11/824,444, dated Aug. 30, 2012 in 19 pages (of-record in the parent application).

Non-Final Office Action issued in U.S. Appl. No. 11/824,444, dated Dec. 22, 2011 in 16 pages (of-record in the parent application).

Notice of Allowance issued in U.S. Appl. No. 11/824,444, dated Nov. 16, 2012 in 9 pages (of-record in the parent application).

Restriction Requirement issued in U.S. Appl. No. 11/824,444, dated Jul. 11, 2011 in 7 pages (of-record in the parent application).

Non-Final Office Action issued in U.S. Appl. No. 11/824,460, dated Feb. 16, 2011 in 15 pages (of-record in the parent application).

Notice of Allowance issued in U.S. Appl. No. 11/824,460, dated Aug. 23, 2011 in 7 pages (of-record in the parent application).

Notice of Allowance issued in U.S. Appl. No. 11/824,460, dated Jan. 20, 2012 in 8 pages (of-record in the parent application).

Restriction Requirement issued in U.S. Appl. No. 11/824,460, dated Oct. 20, 2010 in 7 pages (of-record in the parent application).

Non-Final Office Action issued in U.S. Appl. No. 13/460,228, dated May 21, 2015 in 24 pages (of-record in the parent application).

Notice of Allowance issued in U.S. Appl. No. 13/460,228, dated Nov. 10, 2015 in 6 pages (of-record in the parent application).

Notice of Allowance issued in U.S. Appl. No. 13/471,084, dated Apr. 7, 2014 in 12 pages (of-record in the parent application).

Restriction Requirement issued in U.S. Appl. No. 13/471,084, dated Dec. 27, 2013 in 7 pages (of-record in the parent application).

Non-Final Office Action issued in U.S. Appl. No. 13/847,103, dated Dec. 31, 2014 in 10 pages (of-record in the parent application).

Notice of Allowance issued in U.S. Appl. No. 13/847,103, dated Jun. 23, 2015 in 8 pages (of-record in the parent application).

(56) References Cited

OTHER PUBLICATIONS

Notice of Allowance issued in U.S. Appl. No. 13/847,103, dated Oct. 7, 2015 in 9 pages (of-record in the parent application).
Restriction Requirement issued in U.S. Appl. No. 13/847,103, dated Oct. 2, 2014 in 7 pages (of-record in the parent application).
Non-Final Office Action issued in U.S. Appl. No. 15/071,177, dated May 11, 2017 in 15 pages (of-record in the parent application).
Notice of Allowance issued in U.S. Appl. No. 15/071,177, dated Sep. 7, 2017 in 10 pages (of-record in the parent application).
Advisory Action issued in U.S. Appl. No. 15/169,563, dated Jul. 17, 2018 in 4 pages (of-record in the parent application).
Final Office Action issued in U.S. Appl. No. 15/169,563, dated Aug. 26, 2019 in 12 pages (of-record in the parent application).
Final Office Action issued in U.S. Appl. No. 15/169,563, dated May 24, 2018 in 13 pages (of-record in the parent application).
Non-Final Office Action issued in U.S. Appl. No. 15/169,563, dated Jan. 24, 2019 in 11 pages (of-record in the parent application).
Non-Final Office Action issued in U.S. Appl. No. 15/169,563, dated Sep. 13, 2017 in 11 pages (of-record in the parent application).
Notice of Allowance issued in U.S. Appl. No. 15/169,563, dated Dec. 18, 2019 in 10 pages (of-record in the parent application).
First Action Interview Pilot Program Pre-Interview Communication issued in U.S. Appl. No. 15/590,970, dated Jul. 12, 2017 in 7 pages (of-record in the parent application).
Non-Final Office Action issued in U.S. Appl. No. 15/590,970, dated Jul. 20, 2017 in 9 pages (of-record in the parent application).
Notice of Allowance issued in U.S. Appl. No. 15/590,970, dated Jan. 10, 2018 in 10 pages (of-record in the parent application).
Notice of Allowance issued in U.S. Appl. No. 16/748,464, dated Feb. 20, 2020 in 12 pages (of-record in the parent application).
First Action Interview Office Action Summary issued in U.S. Appl. No. 16/883,031, dated Jul. 17, 2020 in 3 pages (of-record in the parent application).
First Action Interview Pilot Program Pre-Interview Communication issued in U.S. Appl. No. 16/883,031, dated Jun. 17, 2020 in 3 pages (of-record in the parent application).
Notice of Allowance issued in U.S. Appl. No. 16/883,031, dated Aug. 19, 2020 in 7 pages (of-record in the parent application).
First Action Interview Pilot Program Pre-Interview Communication issued in U.S. Appl. No. 17/069,599, dated Aug. 31, 2021 in 4 pages (of-record in the parent application).
Notice of Allowance issued in U.S. Appl. No. 17/069,599, dated Oct. 29, 2021 in 9 pages (of-record in the parent application).
Final Office Action issued in U.S. Appl. No. 17/648,418, dated Oct. 26, 2023 in 7 pages (of-record in the parent application).
Non-Final Office Action issued in U.S. Appl. No. 17/648,418, dated Apr. 27, 2023 in 8 pages (of-record in the parent application).
Notice of Allowance issued in U.S. Appl. No. 17/648,418, dated Dec. 28, 2023 in 5 pages (of-record in the parent application).
U.S. Provisional Application filed Jan. 5, 2007, assigned U.S. Appl. No. 60/878,852 in 27 pages (of-record in the parent application).
U.S. Provisional Application filed Jun. 22, 2007, assigned U.S. Appl. No. 60/936,965 in 28 pages (of-record in the parent application).
First Examination Report issued in Australia Application No. AU2008203892, dated Jun. 21, 2010 in 2 pages (of-record in the parent application).
First Examination Report issued in Australia Application No. AU2008239811, dated Jul. 7, 2010 in 2 pages (of-record in the parent application).
Office Action issued in China Application No. CN200880001749.0, dated Mar. 7, 2011 in 6 pages (of-record in the parent application).
Office Action issued in China Application No. CN200880001749.0, dated Nov. 29, 2011 in 8 pages (of-record in the parent application).
Office Action issued in China Application No. CN200880001789.5, dated Dec. 10, 2012 in 10 pages (of-record in the parent application).
Office Action issued in China Application No. CN200880001789.5, dated May 3, 2012 in 10 pages (of-record in the parent application).
Office Action issued in China Application No. CN200880001789.5, dated Apr. 1, 2013 in 13 pages (of-record in the parent application).
Office Action issued in China Application No. CN200880001789.5, dated Aug. 16, 2013 in 15 pages (of-record in the parent application).
Search Report issued in China Application No. CN200920150110.0, datd Jan. 6, 2011 in 9 pages (of-record in the parent application).
Office Action issued in China Application No. CN201210032702.9, dated Jan. 30, 2014 in 10 pages (of-record in the parent application).
Office Action issued in China Application No. CN201210156120.1, dated Feb. 27, 2014 in 11 pages (of-record in the parent application).
Notice of Decision to Grant issued in China Application No. CN201410319754.3, dated Mar. 16, 2018 in 2 pages (of-record in the parent application).
Office Action issued in China Application No. CN201410319754.3, dated Feb. 6, 2017 in 25 pages (of-record in the parent application).
Office Action issued in China Application No. CN201410319754.3, dated Nov. 29, 2017 in 3 pages (of-record in the parent application).
Office Action issued in China Application No. CN201410560169.2, dated Mar. 10, 2016 in 10 pages (of-record in the parent application).
Office Action issued in European Application No. EP08712956.5, dated May 12, 2010 in 7 pages (of-record in the parent application).
Office Action issued in European Application No. EP08712959.9, dated Apr. 23, 2010 in 7 pages (of-record in the parent application).
Extended European Search Report issued in European Application No. EP11188316.1, dated Apr. 23, 2012 in 15 pages (of-record in the parent application).
Office Action issued in European Application No. EP11188316.1, dated Jan. 24, 2017 in 4 pages (of-record in the parent application).
Partial European Search Report issued in European Application No. EP11188316.1, dated Jan. 25, 2012 in 6 pages (of-record in the parent application).
Extended European Search Report issued in European Application No. EP11188332.8, dated Jul. 30, 2012 in 14 pages (of-record in the parent application).
Office Action issued in European Application No. EP11188332.8, dated Dec. 2, 2015 in 3 pages (of-record in the parent application).
Office Action issued in European Application No. EP11188332.8, dated Mar. 28, 2013 in 6 pages (of-record in the parent application).
Extended European Search Report issued in European Application No. EP11188483.9, dated Jan. 24, 2012 in 5 pages (of-record in the parent application).
Extended European Search Report issued in European Application No. EP11188493.8, dated Dec. 23, 2011 in 5 pages (of-record in the parent application).
Extended European Search Report issued in European Application No. EP13171961.9, dated Nov. 18, 2013 in 13 pages (of-record in the parent application).
Partial European Search Report issued in European Application No. EP13171961.9, dated Sep. 10, 2013 in 5 pages (of-record in the parent application).
Extended European Search Report issued in European Application No. EP13171968.4, dated Sep. 23, 2013 in 7 pages (of-record in the parent application).
Extended European Search Report issued in European Application No. EP13171970.0, dated Jul. 26, 2013 in 7 pages (of-record in the parent application).
Extended European Search Report issued in European Application No. EP13171972.6, dated Sep. 23, 2013 in 8 pages (of-record in the parent application).
Extended European Search Report issued in European Application No. EP17153551.1, dated Jun. 27, 2017 in 11 pages (of-record in the parent application).
Office Action issued in European Application No. EP17153551.1, dated May 16, 2018 in 5 pages (of-record in the parent application).
Examination Report issued in India Application No. IN2569/KOLNP/2009, dated Aug. 29, 2014 in 2 pages (of-record in the parent application).
Office Action issued in Japan Application No. JP2013-77925, dated Feb. 4, 2014 in 2 pages (of-record in the parent application).

(56) References Cited

OTHER PUBLICATIONS

Leo , "MacBook Pro Mit Unsichtbarer iSight-Statusanzeige [Update]", Available online at: http://www.fscklog.com/2006/10/macbook_pro_mit_1.html, Oct. 28, 2006, 4 pages (of-record in the parent application).
Nobihaya , "MacBook Pro [2006/Fall]", Available online at: http://flickr.com/photos/nobihaya/279927592/, Oct. 26, 2006, 3 pages (of-record in the parent application).
International Preliminary Report on Patentability issued in PCT Application No. PCT/US2008/000080, dated Jul. 7, 2009 in 12 pages (of-record in the parent application).
International Search Report issued in PCT Application No. PCT/US2008/000080, dated Nov. 28, 2008 in 5 pages (of-record in the parent application).
Written Opinion issued in PCT Application No. PCT/US2008/000080, dated Jul. 6, 2009 in 11 pages (of-record in the parent application).
International Preliminary Report on Patentability issued in PCT Application No. PCT/US2008/000081, dated Jul. 7, 2009 in 9 pages (of-record in the parent application).
International Search Report and Written Opinion issued in PCT Application No. PCT/US2008/000081, dated Jun. 24, 2008 in 11 pages (of-record in the parent application).
International Preliminary Report on Patentability issued in PCT Application No. PCT/US2008/000082, dated Jul. 7, 2009 in 9 pages (of-record in the parent application).
International Search Report issued in PCT Application No. PCT/US2008/000082, dated Jun. 11, 2008 in 13 pages (of-record in the parent application).
Written Opinion issued in PCT Application No. PCT/US2008/000082, dated Jul. 6, 2009 in 8 pages (of-record in the parent application).
International Preliminary Report on Patentability issued in PCT Application No. PCT/US2008/000084, dated Jul. 7, 2009 in 9 pages (of-record in the parent application).
International Search Report and Written Opinion issued in PCT Application No. PCT/US2008/000084, dated Jun. 18, 2009 in 10 pages (of-record in the parent application).
International Preliminary Report on Patentability issued in PCT Application No. PCT/US2008/000098, dated Jul. 7, 2009 in 8 pages (of-record in the parent application).
International Search Report issued in PCT Application No. PCT/US2008/000098, dated Jun. 2, 2008 in 11 pages (of-record in the parent application).
Written Opinion issued in PCT Application No. PCT/US2008/000098, dated Jul. 6, 2009 in 7 pages (of-record in the parent application).
International Preliminary Report on Patentability issued in PCT Application No. PCT/US2008/000099, dated Jul. 7, 2009 in 11 pages (of-record in the parent application).
International Search Report and Written Opinion issued in PCT Application No. PCT/US2008/000099, dated Jun. 30, 2008 in 12 pages (of-record in the parent application).
International Preliminary Report on Patentability issued in PCT Application No. PCT/US2008/000210, dated Jul. 7, 2009 in 9 pages (of-record in the parent application).
International Search Report and Written Opinion issued in PCT Application No. PCT/US2008/000210, dated Jun. 2, 2008 in 11 pages (of-record in the parent application).
Office Action issued in Taiwan Application No. TW097100440, dated Jul. 4, 2011 in 10 pages (of-record in the parent application).
Office Action issued in Taiwan Application No. TW097100446, dated Nov. 9, 2012 in 5 pages (of-record in the parent application).
Office Action issued in Taiwan Application No. TW097100456, dated Nov. 21, 2012 in 7 pages (of-record in the parent application).
Office Action issued in Taiwan Application No. TW097100458, dated Jan. 19, 2012 in 12 pages (of-record in the parent application).
Office Action issued in Taiwan Application No. TW097100488, dated Oct. 23, 2013 in 14 pages (of-record in the parent application).
Office Action issued in Taiwan Application No. TW097100488, dated Nov. 20, 2012 in 6 pages (of-record in the parent application).
Office Action issued in Taiwan Application No. TW097100493, dated Aug. 1, 2014 in 12 pages (of-record in the parent application).
Office Action issued in Taiwan Application No. TW097100493, dated Oct. 3, 2013 in 15 pages (of-record in the parent application).
Office Action issued in Taiwan Application No. TW097100493, dated Apr. 6, 2012 in 7 pages (of-record in the parent application).
Office Action issued in Taiwan Application No. TW097100493, dated Dec. 27, 2012 in 8 pages (of-record in the parent application).
Office Action issued in Taiwan Application No. TW10110684, dated May 14, 2014 in 7 pages (of-record in the parent application).
Office Action issued in Taiwan Application No. TW101121637, dated Aug. 12, 2015 in 12 pages (of-record in the parent application).
Office Action issued in Taiwan Application No. TW101121637, dated Sep. 26, 2014 in 7 pages (of-record in the parent application).
Notice of Decision to Grant issued in Taiwan Application No. TW105115908, dated Mar. 28, 2018 in 3 pages (of-record in the parent application).
Office Action issued in Taiwan Application No. TW105115908, dated Jun. 2, 2017 in 14 pages (of-record in the parent application).
Office Action issued in Taiwan Application No. TW105115908, dated Dec. 7, 2016 in 4 pages (of-record in the parent application).

IN-EAR HEADPHONE

CROSS-REFERENCE TO RELATED APPLICATIONS

This application is a continuation application of U.S. application Ser. No. 17/648,418 entitled "IN-EAR HEADPHONE," filed on Jan. 19, 2022, which is a continuation application of U.S. application Ser. No. 17/069,599 entitled "IN-EAR HEADPHONE," filed on Oct. 13, 2020, which is a continuation application of U.S. application Ser. No. 16/883,031 entitled "IN-EAR HEADPHONE," filed on May 26, 2020, which is a continuation application of U.S. application Ser. No. 16/748,464 entitled "IN-EAR HEADPHONE," filed on Jan. 21, 2020, which is a continuation application of U.S. application Ser. No. 15/169,563 entitled "IN-EAR HEADPHONE," filed on May 31, 2016 ("the '563 application"), which claims priority to U.S. Provisional Patent Application No. 62/235,348 filed on Sep. 30, 2015 ("the '348 application"). The disclosure of each the '563 and the '348 applications is incorporated herein by reference in its entirety for all purposes.

FIELD

The described embodiments relate generally to features and structures of in-ear headphones. More particularly, the present embodiments relate to a design in which a portion of an earbud passes through a channel defined by an ear of a user.

BACKGROUND

Audio devices along the lines of in-ear headphones often have trouble achieving a size and shape that fits comfortably and stays securely in place for a large cross-section of users. Earbuds in particular often fall short of a design that fits comfortably within an ear of a user while achieving a high level of audio content delivery. One reason for this problem is that the size and shape of the ears of users can vary widely, making it difficult to achieve a design capable of fitting comfortably within the ears of a broad spectrum of users. For this reason, a comfortable earbud design capable of remaining securely within the ears of a broad spectrum of different ears while maintaining high quality audio content delivery is desired.

SUMMARY

This paper describes various embodiments that relate to low-profile, in-ear headphone designs.

An earbud is disclosed that includes the following: an earbud housing; a balanced armature audio driver positioned within the earbud housing; a nozzle protruding from an end of the earbud housing and a cable protruding from the housing the end of the earbud, the cable being configured to provide power and data to circuitry within the earbud housing.

Another earbud is disclosed that includes the following: a housing; a nozzle protruding from the housing and defining an opening through which audio leaves the housing; an audio driver positioned within the housing and proximate to the nozzle; and a protrusion extending from the housing at an angle that causes a portion of the protrusion to be routed through a channel defined by the tragus and anti-tragus of an ear of a user. The protrusion can define an interior volume within which additional electrical components and sensors can be positioned. Alternatively, the protrusion can take the form of a protruding cable that carries audio and data to and from the earbud.

Yet another earbud is disclosed. The earbud includes the following: a housing; an audio driver positioned within the housing; a nozzle protruding from an end of the housing and defining an opening through which audio emitted by the audio driver leaves the housing; and a protrusion extending from the end of the housing, the protrusion enclosing a plurality of electrical components, the electrical components including a battery, and an antenna. In many embodiments, the protrusion can also enclose a microphone configured to record audio generated by a user wearing the earbud.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
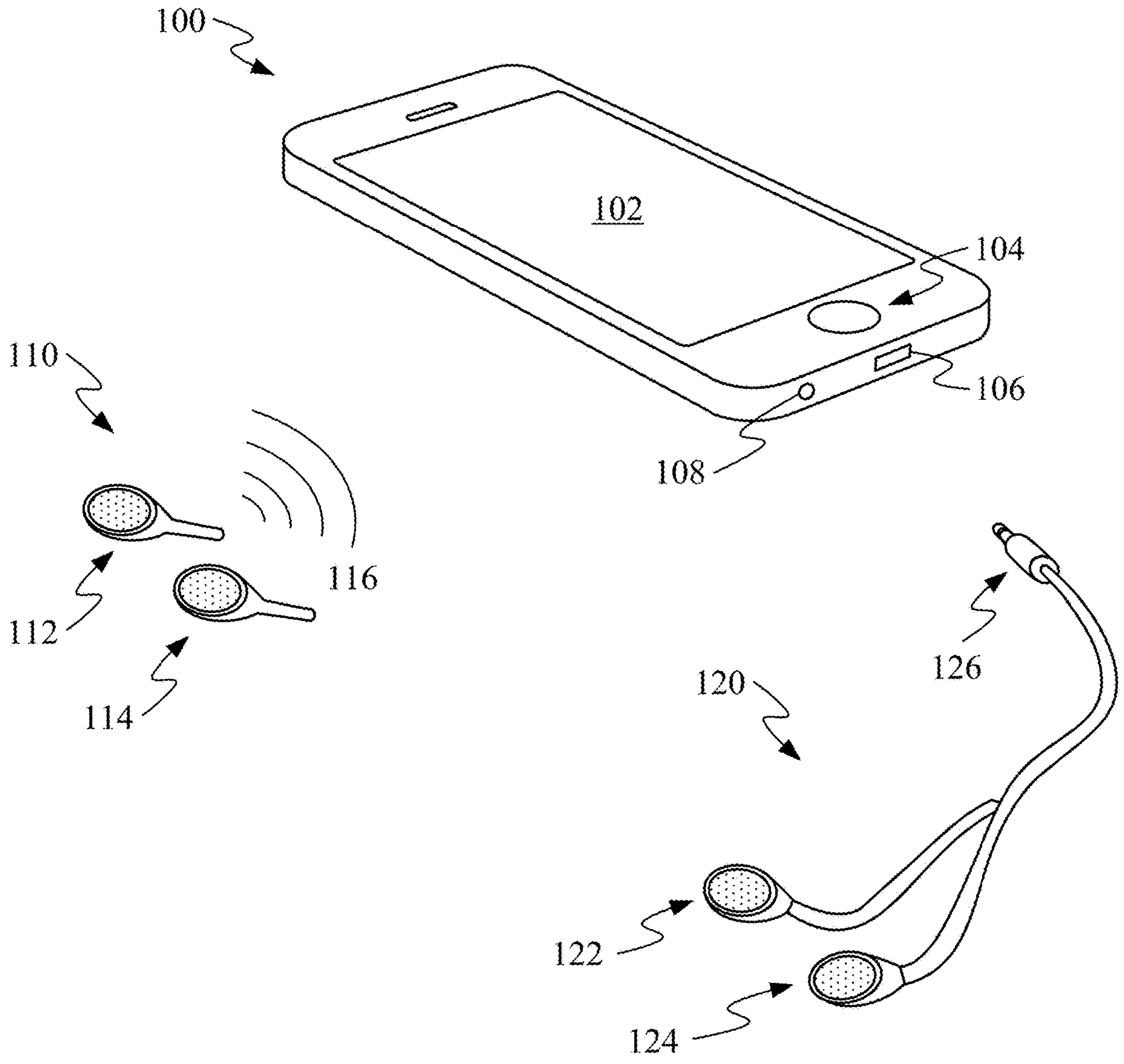
FIG. 1 shows a perspective view of a portable electronic device and a number of accessory devices suitable for use with the portable electronic device.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In-ear headphones can be challenging to make for a broad spectrum of users since there are such a wide variety of ear sizes and shapes. What is desired is an earbud design that fits both comfortably and securely within an ear of a user while also providing excellent audio output. One solution to this problem is to design an earbud configured to sit within the ear of a user and to have a portion that fits within a channel defined by the tragus and anti-tragus of an ear of a user. By configuring the portion of the earbud to pass within the channel an overall shape and size of the rest of the ear becomes less important in retaining the earbud within the ear of the user.

In some embodiments, the earbud can have a sealed earbud housing enclosing a number of balanced armature audio drivers. Balanced armature audio drivers include a coil held in place between two magnets until the coil is stimulated by an electric current. When the coil is stimulated by electric current the coil begins to oscillate at a frequency that causes the diaphragm to vibrate and generate sound waves. The sealed earbud housing structure can be important for generating quality low frequency output from a balanced armature audio driver. The earbud housing can be a low-profile design configured to fit unobtrusively within the ear of the user. A separate assembly can protrude from one end of the earbud housing so that it passes through a channel defined by two portions of the ear. The protruding portion can take many forms. In some embodiments, the protruding assembly can take the form of a cable that transfers power and data between the earbud and a digital or analog connector of a portable media device. In some embodiments, the protruding assembly can be operable as a microphone boom that houses various components of the earbud housing. For example, the microphone boom could include components along the lines of a battery, an antenna and one or more sensors. The antenna can be configured to transfer data between the earbud and a nearby electrical device along the lines of portable media device 100 discussed below with respect to FIG. 1. For example, the antenna could be configured to communicate by Bluetooth and/or WiFi® protocols. When the microphone boom is pointed towards the mouth of the user a microphone can be positioned at an end of the boom pointed towards the mouth so the strength of audio received at the microphone and spoken by the user can be maximized. This configuration can help to reduce the 16 dB loss of signal strength that normally occurs to audio leaving a user's mouth and travelling to an ear of the user.

The low profile nature of the housing also allows placement of a microphone along the outside of the low-profile earbud body to maximize performance of noise canceling functionality. In this way, audio signals approaching the ear canal can be measured by the microphone and then countered by destructive interference, generally referred to as active noise cancellation. In some embodiments, the earbud can also include a nozzle protruding from the earbud housing and configured to deliver audio signals into the ear canal of the user. The nozzle can be pivotally coupled with the earbud housing so that it is able to rotate with respect to the earbud housing. In this way, the nozzle can be configured to be oriented directly down the ear canal of a user to help achieve a more customized fit. An interface between the nozzle and the earbud housing can take the form of an elastomeric boot that accommodates the relative motion and prevents the leakage of audio or the ingress of contaminates into the nozzle or earbud housing. Mid and/or high frequency audio drivers can be positioned within the earbud housing so that a length of the audio path between the mid and/or high frequency audio drivers and an exit of the nozzle is minimized.

These and other embodiments are discussed below with reference to FIGS. 1-4C; however, those skilled in the art will readily appreciate that the detailed description given herein with respect to these figures is for explanatory purposes only and should not be construed as limiting.

FIG. 1 shows a portable media device 100 suitable for use with a variety of accessory devices. Portable media device 100 can include touch sensitive display 102 configured to provide a touch sensitive user interface for controlling portable media device 100 and in some embodiments any accessories to which portable media device 100 is electrically or wirelessly coupled. In some embodiments, portable media device 100 can include additional controls such as, for example, button 104. Portable media device 100 can also include multiple hard-wired input/output (I/O) ports that include digital I/O port 106 and analog I/O port 108. Accessory device 110 can take the form of an audio device that includes two separate earbuds 112 and 114. Each of earbuds 112 and 114 can include wireless receivers or transceivers capable of establishing a wireless link 116 with portable media device 100. Accessory device 120, which can also be compatible with portable media device 100, can take the form of a wired audio device that includes earbuds 122 and 124. Earbuds 122 and 124 can be electrically coupled to each other and to a connector plug 126 by a number of wires. In embodiments where connector plug 126 is an analog plug (as depicted), audio drivers within earbuds 122 and 124 can receive power through analog I/O port 108 while transmitting data by way of a wireless protocol such as Bluetooth, Wi-Fi, or the like. In embodiments where connector plug 126 interacts with digital I/O port 106, sensor data and audio data can be freely passed through the wires during use of portable media device 100 and accessory device 120. It should be noted that earbuds 122 and 124 can be swappable between left and right ears when the wire attached to each earbud is attached along a line of symmetry of each earbud, or alternatively when the wire is attached by a pivoting coupling. It should also be noted that stereo channels can be swapped between wires when attached to digital I/O port 106.

Figure 2:
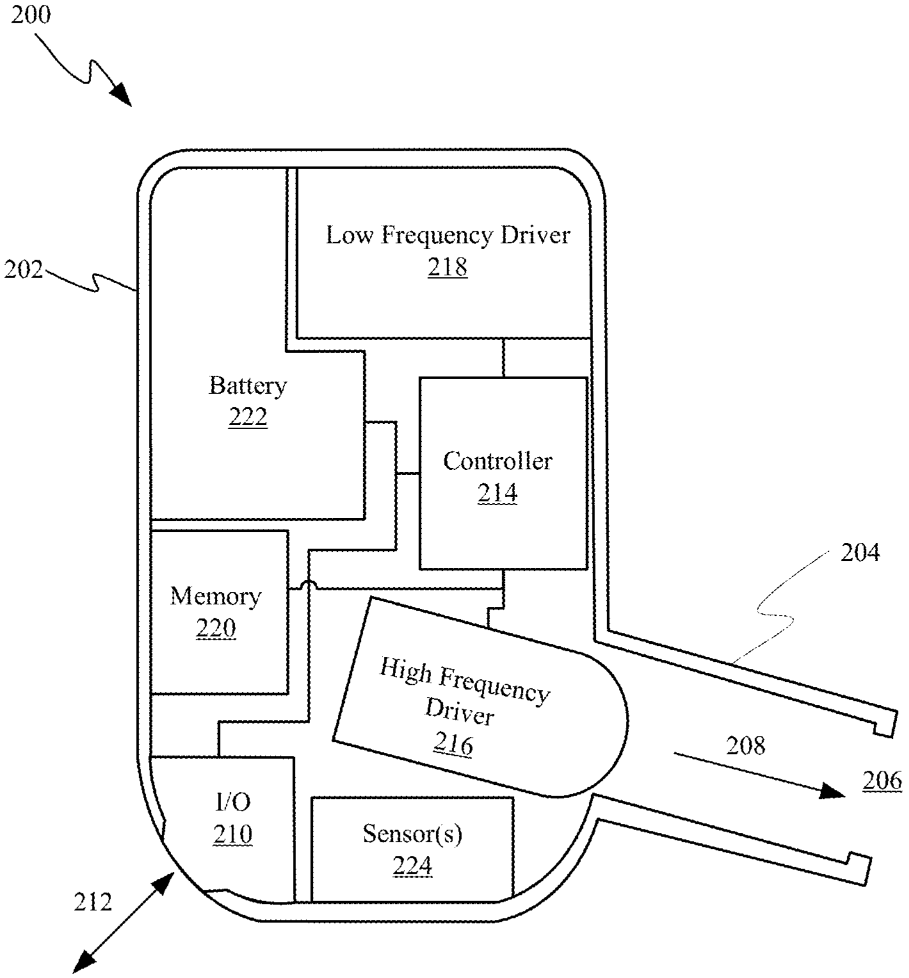
FIG. 2 shows a block diagram illustrating exemplary internal components of an earbud.

FIG. 2 shows a schematic view of an earbud 200 that can be incorporated into accessory device 110 as earbud 112 and/or earbud 114 or incorporated into accessory device 120 as earbud 122 and/or earbud 124. In some embodiments, earbud 200 can include a housing 202. Housing 202 can have a size and/or shape that allows it to be easily inserted within the ear of an end user. Housing 202 also defines an interior volume within which numerous electrical components can be distributed. Housing 202 can also include a nozzle 204 that defines an opening 206 at a distal end of nozzle 204, which provides a channel by which audio signals can pass into the ear canal of a user of earbud 200, as indicated by the arrow 208.

Housing 202 can include an I/O interface 210 configured to transmit and receive information from another device such as, for example, portable media device 100 by way of link 212. Link 212 can be generated in various ways. For example, link 212 can be a wireless link when I/O interface 210 takes the form of a wireless transceiver suitable for use in an accessory such as accessory device 110 depicted in FIG. 1. Alternatively, link 212 can take the form of a wired connector such as the wires of accessory device 120. In addition to providing a conduit for receiving power, I/O interface 210 can also be used to receive audio content that can be processed by a processor or controller 214 and sent on to high frequency driver 216 and low frequency driver 218. While high frequency driver 216 and low frequency driver are depicted as separate components, it should be understood that in some embodiments these drivers could be combined into a unitary audio driver. I/O interface 210 can also receive control signals from a device similar to portable media device 100 for accomplishing tasks such as adjusting a volume output of drivers 216 and 218. When I/O interface 210 takes the form of a wireless transceiver, I/O interface 210 can include an antenna configured to transmit and receive signals through an antenna window or an opening defined by housing 202. This type of antenna can be used to transmit data using one or more wireless protocols, e.g. Wifi® and Bluetooth®. The antenna window can be particularly important when housing 202 is formed of radio opaque material. In some embodiments, I/O interface 210 can also represent one or more exterior controls (e.g. buttons and/or switches) for performing tasks such as pairing earbud 200 with another device or adjusting various settings of earbud 200 such as volume or the like.

Earbud 200 can also include a memory 220, which can be configured to carry out any number of tasks. For example, memory 220 can be configured to store media content when a user of earbud 200 wants to use earbud 200 independent from any other device. In such a use case, memory 220 can be loaded with one or more media files for independent playback. When earbud 200 is being used with another device, memory 220 can also be used to buffer media data received from the other device. To support independent use cases, memory 220 can also be used to store entire media files and/or playlists for later playback independent of any other device. With the possible exception of when I/O interface 210 is a wired interface that can provide power to earbud 200 from another device or power source, battery 222 is generally used for powering operations of earbud 200. Battery 222 can provide the energy needed to perform any of a number of tasks including maintain a wireless link 212, powering controller 214, powering speaker drivers 216 and 218, and powering one or more sensors 224. While sensors 224 are shown as a generic block, sensors 224 can include sensors such as microphones, orientation sensors, proximity sensors or any other sensor suitable for improving the user experience of earbud 200. For example, a microphone positioned within housing 202 could be arranged to detect sound waves approaching earbud 200. When the sound waves are assessed to be white noise, the sound waves can be characterized by controller 214 and then a noise cancelling speaker associated with the microphone can receive instructions from controller 214 to emit sound waves configured to cancel out the sound waves detected by the microphone. In some embodiments, this microphone could take the form of a directional microphone configured to record only the audio arriving from a particular direction. For example, the directional microphone could be tuned to only record or detect audio originating at or near the mouth of a user of earbud 200. It should be noted that sensor(s) 224 are not required in all of the embodiments described herein.

Figure 3A:
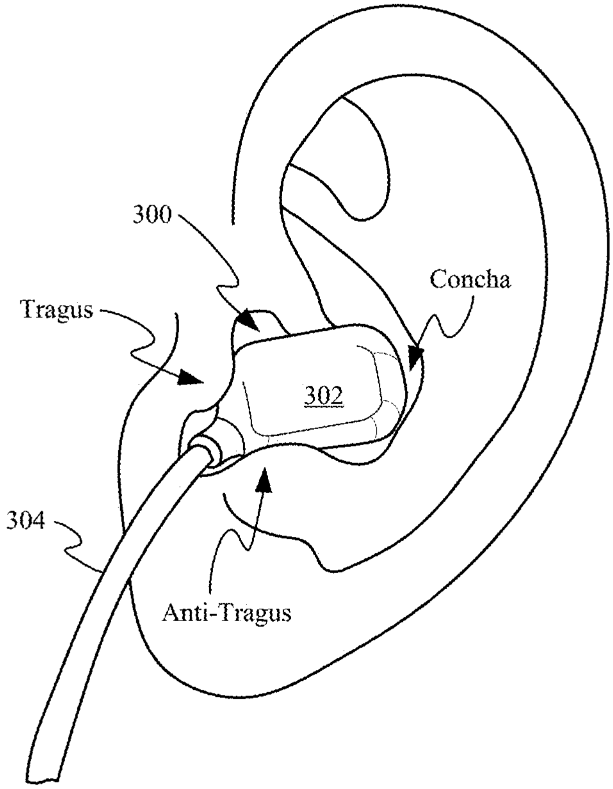
FIGS. 3A-3D show perspective views of a corded in-ear earbud.

FIG. 3A shows an earbud housing 302 of an earbud 300 positioned within the ear of a user. As depicted, earbud 300 is located almost entirely within the ear of a user. The substantially rectangular geometry of housing 302 is sized to fit tucked into the ear when properly installed within the ear. A rear portion of housing 302 can have a curved geometry that helps to reduce or prevent the occurrence of any pressure points forming between housing 302 and the concha of the ear. Cable cord 304 extends away from housing 302 at an angle designed to route cable cord 304 between the tragus and anti-tragus as depicted. As a result of the channel defined by the tragus and anti-tragus being generally narrow enough, any inadvertent tugs on cable cord 304 are unlikely to dislodge earbud 300 on account of resistance imparted to earbud housing 302 by the tragus and anti-tragus.

Figure 3B:
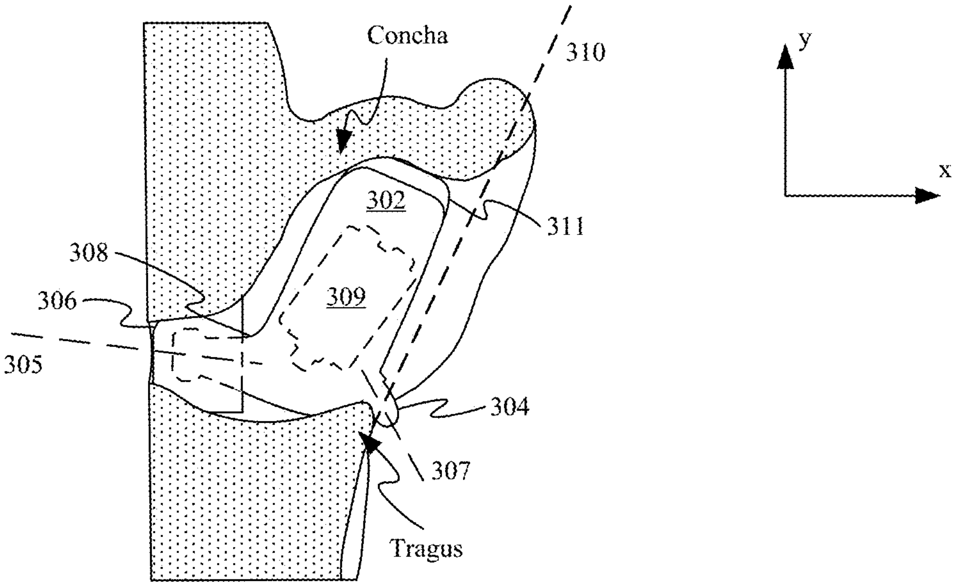

FIG. 3B shows a cross-sectional top view of earbud 300 within the ear of the user. An earbud tip 306 is shown compressed within the ear canal of the ear so that it seals the ear canal of the user. FIG. 3B also shows a relative angle between nozzle 308 and cable cord 304. An angle between an axis 305 that bisects and extends through nozzle 308 and an axis 307 that bisects and extends through a base of cable cord 304 can be between 90 and 130 degrees. In some embodiments, variation of the angle between cable cord 304 and nozzle 308 can be between 100 degrees and 110 degrees with respect to the x-y plane shown in FIG. 3B. FIG. 3B also shows how earbud housing 302 can be positioned between the tragus and concha of the ear of the user. FIG. 3B also shows how balanced armature audio driver 309 can be positioned within housing 302 as depicted so that it is directed towards and positioned close to an exit opening defined by nozzle 308. In this way, an amount of attenuation due to an offset between audio driver 309 and nozzle 308 can be reduced. Reference line 310 demonstrates how the small form factor of earbud housing 302 remains within a recess defined by the ear. It should be noted that in some embodiments, deformable member 309, which can be formed from a piece of silicone or foam and attached to the earbud housing to create an interference fit between earbud housing 302 and one or more surface of the ear defining the recess. As depicted, deformable member 309 contacts the concha portion of the ear. Deformable member 309 can increase the comfort of earbud 300 and can help earbud housing 302 accommodate a broader range of users as a result of the deformability it imparts to earbud 300.

Figure 3C:
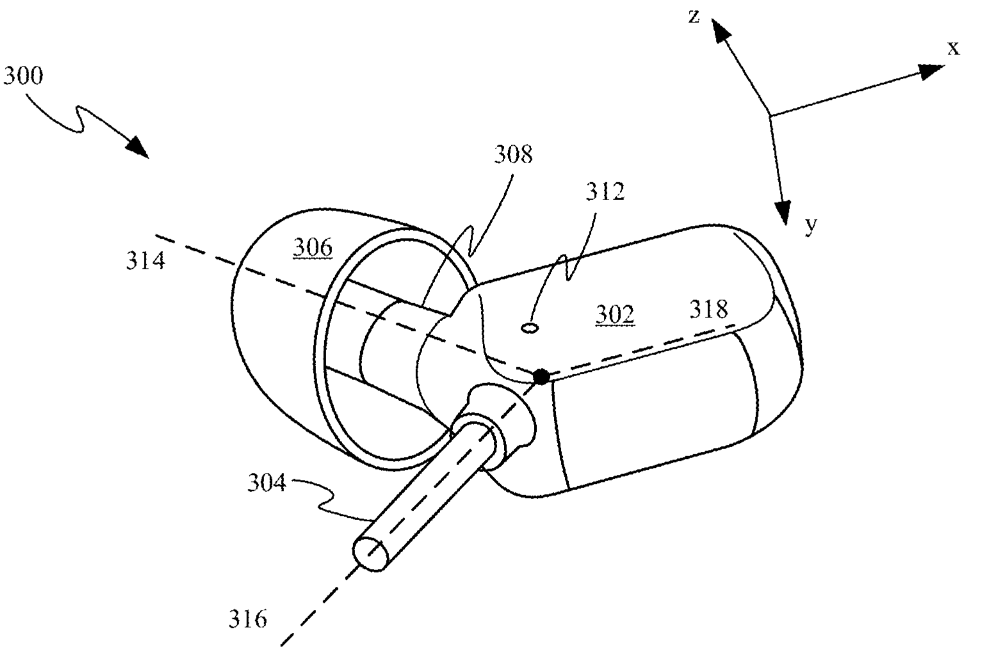

FIG. 3C shows a perspective view of earbud 300 removed from the ear. Earbud tip 306 is now depicted in its undeformed shape. While earbud tip 306 is depicted having a substantially parabolic shape, it should be understood that any earbud shape is possible and that earbud tip 306 can be formed from any number of deformable materials including but not limited to silicone, rubber, and foam. Earbud tip 306 fits over a portion of nozzle 308 of housing 302. Nozzle 308 is configured to direct audio out of housing 302 and into the ear canal of a user through an opening defined by a central portion of ear tip 306. In some embodiments, nozzle 308 can take the form of an extension of and rigidly coupled with housing 302.

Housing 302 can also define an opening 312 for a microphone disposed within housing 302. Placement of opening 312 in this location allows the microphone when located proximate the opening to be close to the ear canal of a user. The particularly thin dimensions of housing 302 allows this close proximity of the microphone with respect to the ear canal. Audio arriving at the microphone can then be utilized as an input for a noise cancellation system, that generates destructive interference waves to counter the audio approaching the ear canal of the user. The noise cancelation system can include an additional speaker or speakers for generating the destructive interference waves.

As mentioned above, angles between the various components of earbud 300 make substantial differences in the fit and security of earbud 300 within the ear of the user. It should be noted that an angle between a direction 314 associated with nozzle 308 and a direction 316 associated with cord 304 with respect to the x-z plane can be between 40 degrees and 50 degrees. During user trials, this range of angles between nozzle 308 and cord 304 was found to fit a large percent of users' ears. Direction 318 is aligned with housing 302 and an angle between direction 318 and direction 314 can vary between 150 degrees and 160 degrees with respect to the x-z plane. Nozzle 308 and cable cord 304 are both positioned at one end of earbud housing 302, as depicted. This allows nozzle 308 and earbud tip 306 to engage the ear canal of a user and cable cord 304 to engage the channel defined by the tragus and anti-tragus of the ear, as depicted in FIG. 3A.

Figure 3D:
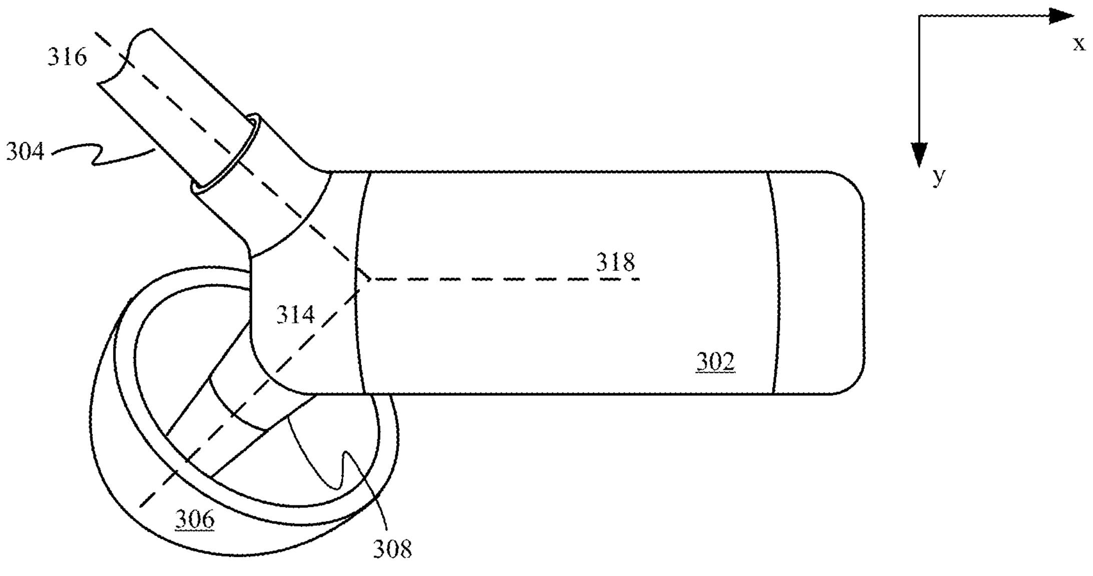

FIG. 3D shows a bottom, perspective view of housing 302 and directions 314 and 316 illustrate an angle between cable cord 304 and nozzle 308 with respect to the x-y plane of between 100 degrees and 110 degrees. An angle between direction 316 and 318 with respect to the x-y plane can be between 150 and 160 degrees, while an angle between directions 314 and 318 with respect to the x-y plane can be between 130 and 140 degrees.

In some embodiments, nozzle 308 can be configured to pivot about one or more axes with respect to housing 302. In this way, a direction 314 in which nozzle 308 is aligned can be adjusted when a user of earbud 300 has an ear canal that deviates from the angle in which nozzle 308 is designed to be pointed. In some embodiments, the pivoting can include a locking device or ratcheting device that prevents inadvertent motion of nozzle 308 with respect to housing 302 during active use such as for example during a high activity workout.

Figure 4A:
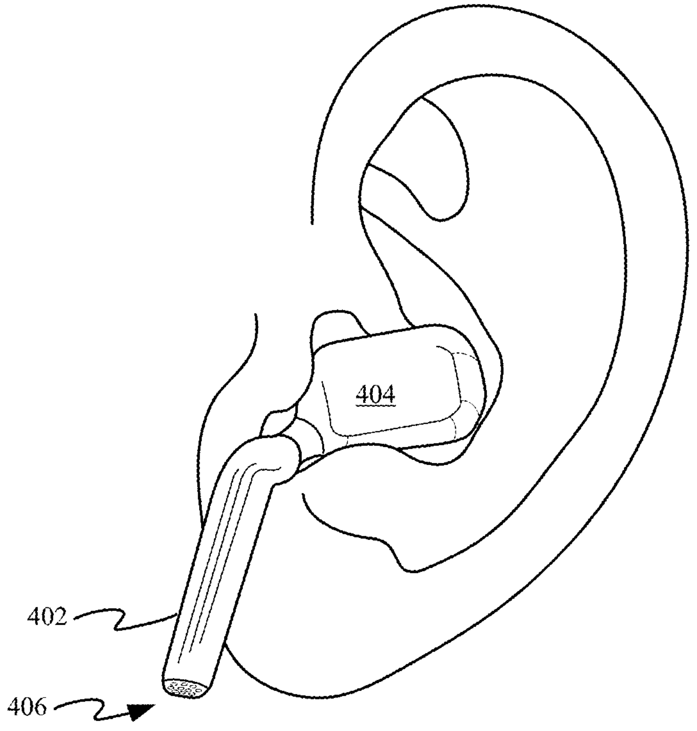
FIGS. 4A-4B show perspective views of a wireless in-ear earbud.
Figure 4B:
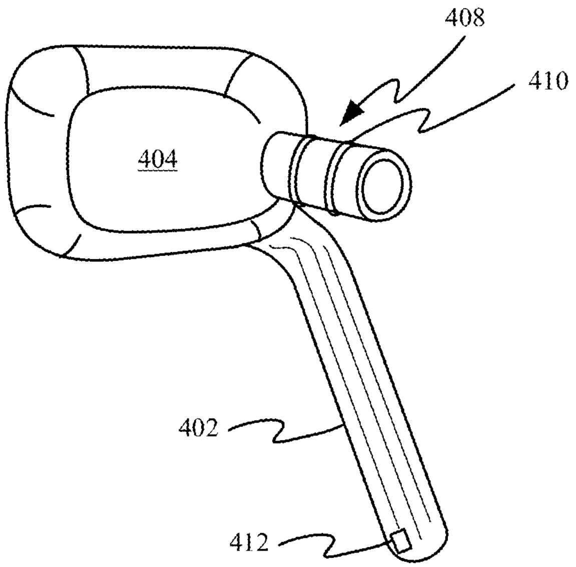

FIGS. 4A-4B represent an alternative wireless embodiment in which earbud 400 includes protrusion 402, which takes the place of cable cord 304. Protrusion 402 can house multiple additional components such as, for example, a battery, an antenna assembly and one or more microphones. The additional weight of protrusion 402 can help to keep housing 404 of earbud 400 engaged within the channel defined by the tragus and anti-tragus of the ear. Protrusion 402 also provides a convenient way to position a microphone closer to the ear of a user and in this way can act as a microphone boom. In this way, an amount of acoustic energy spoken by a user wearing earbud 400 can be substantially increased when compared with a microphone positioned within the ear of a user. A size and shape of protrusion 402 can be adjusted to accommodate a certain length antenna and/or number of battery cells. In some embodiments, the substantial length of protrusion 402 allows for improved antenna performance and allows the overall device to attain a desired balance. In some embodiments, protrusion 402 can have a circular geometry and be at least two times longer than housing 404. Angles between the various features of earbud 400 can be similar to those mentioned above, where the angle of the portion of housing 404 in communication with protrusion 402 has about the same angle with respect to housing 404 that cable cord 304 has with respect to housing 302. While protrusion 402 is shown having a substantially linear geometry, it should be noted that protrusion 402 can vary in size and shape as well. For example, protrusion 402 can be curved so that a distal end of protrusion 402 faces more precisely towards the mouth of a user. In this way, a microphone positioned at a distal end of protrusion 402 can have greater sensitivity and be able to record audio spoken by a user of earbud 400 with greater precision.

FIG. 4B shows a perspective view of earbud 400 removed from the ear of the user so that nozzle 408 is exposed. Angles between nozzle 408, housing 404 and protrusion 402 can correspond to those angles depicted between nozzle 308, housing 302 and cable 304. For example, an angle between nozzle 408 and protrusion 402 can be on the order of between about 100 and 110 degrees. Nozzle 408 can include a number of ridges 410 that help to retain an earbud tip coupled with an end of nozzle 408. The earbud tip (not depicted) can help provide a robust seal between earbud 400 and the ear canal of the user. In addition to housing multiple other electrical components protrusion 402 can also include electrical contact 412 for charging batteries disposed within protrusion 402 and/or housing 404. In some embodiments, protrusion 402 and/or housing 404 can include multiple contacts 412. Electrical contact 412 can also be used for updating a memory device disposed within housing 404. For example, media items could be transferred by way of electrical contact(s) 412.

Figure 4C:
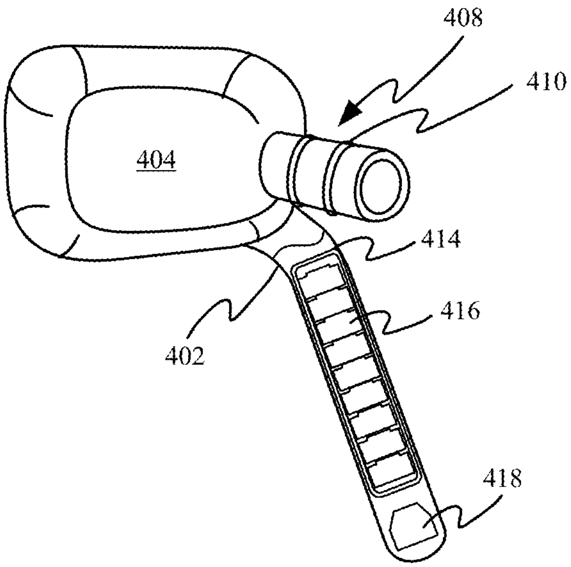
FIG. 4C shows a partial cutaway view of the wireless in-ear earbud depicted in FIGS. 4A and 4B.

FIG. 4C shows a partial cutaway view of protrusion 402 of earbud 400. In particular, the cutaway view shows electrical components disposed within protrusion 402. As depicted, wireless antenna 414 can extend along a substantial portion of a length of protrusion 402. In this way, wireless signal quality and transmission can be enhanced because the antenna can extend across a longer distance than it could otherwise if it had to be accommodated within housing 404. While wireless antenna 414 is depicted taking the form of an extended rectangular geometry, other configurations are also possible. In some embodiments, multiple wireless antenna 414 can take the form of multiple antennae. This positioning also allows wireless antenna 414 to extend away from the user, thereby reducing any attenuation or masking caused by the user's body. Protrusion 402 can also house one or more batteries 416. While multiple batteries 416 are depicted it should be appreciated that a single larger battery 416 could also be utilized. Protrusion 402 can also include microphone 418, positioned at a bottom end of protrusion 402. This positioning can help microphone 418 be positioned as close as possible to microphone openings positioned at a distal end of protrusion 402. In this way, audio vocalized by a user of earbud 400 can be more efficiently recorded on account of microphone 418 being located much closer to the mouth of a user when compared to a microphone positioned within housing 404.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless in-ear headphone comprising:

a device housing that defines an interior cavity;

a nozzle extending away from the device housing and defining an audio port that opens to the interior cavity;

a deformable ear tip having a central opening fitted over the nozzle;

an audio driver disposed within the device housing and aligned to emit sound through the audio port;

a wireless antenna and wireless circuitry disposed within the device housing, the wireless circuitry configured to establish a wireless communication link with a host device over the wireless antenna;

a microphone;

an active noise cancellation system configured to generate destructive interference waves to counter audio picked up by the microphone;

a button control disposed at an exterior surface of the device housing and configured to receive a user input;

a controller disposed within the device housing and operatively coupled to the wireless circuitry and to the button control, wherein the controller is configured to process audio content received from the wireless circuitry and deliver the processed audio content to the audio driver for output through the nozzle, and wherein the controller is further configured to adjust a setting of the in-ear headphone in response to the button control;

a battery disposed in the device housing and configured to provide power to circuitry within the device housing; and a plurality of electrical contacts disposed along a surface of the device housing and electrically coupled to the battery to enable the battery to be charged from an external power source.

2. The wireless in-ear headphone set forth in claim 1 further comprising an elastomeric boot coupled between the nozzle and the device housing.

3. The wireless in-ear headphone set forth in claim 2 wherein the elastomeric boot accommodates relative motion between the nozzle and the device housing.

4. The wireless in-ear headphone set forth in claim 3 wherein the elastomeric boot is configured to prevent ingress of contaminates into the nozzle and the device housing.

5. The wireless in-ear headphone set forth in claim 1 wherein the nozzle includes at least one ridge to help retain the deformable earbud tip on the nozzle.

6. The wireless in-ear headphone set forth in claim 2 wherein the audio driver is disposed proximate to and extends partially within the nozzle.

7. The wireless in-ear headphone set forth in claim 1 further comprising a plurality of sensors disposed within the device housing, the plurality of sensors including an accelerometer and a proximity sensor.

8. The wireless in-ear headphone set forth in claim 1 wherein the audio driver is disposed within the device housing and aligned to emit sound through the audio port is a first audio driver and wherein the wireless in-ear headphone further comprises a second audio driver disposed within the device housing.

9. The wireless in-ear headphone set forth in claim 8 wherein the first audio driver is a high frequency audio driver and the second audio driver is a low frequency audio driver.

10. The wireless in-ear headphone set forth in claim 9 wherein each of the first and second audio drivers are balanced armature audio drivers.

11. The wireless in-ear headphone set forth in claim 1 further comprising a directional microphone aligned to detect sound emitted from a user's mouth when the wireless in-ear headphone is worn within an ear of the user.

12. The wireless in-ear headphone set forth in claim 1 wherein the controller is configured to adjust a volume of the in-ear headphone in response to the button control.

13. A wireless in-ear headphone comprising:

a device housing that defines an interior cavity;

a nozzle extending away from the device housing and defining an audio port that opens to the interior cavity;

a deformable ear tip having a central opening fitted over the nozzle;

an audio driver disposed within the device housing and aligned to emit sound through the audio port;

a wireless antenna and wireless circuitry disposed within the device housing, the wireless circuitry configured to establish a wireless communication link with a host device over the wireless antenna;

a microphone;

an active noise cancellation system configured to generate destructive interference waves to counter audio picked up by the microphone;

a button control disposed at an exterior surface of the device housing and configured to receive a user input;

a controller disposed within the device housing and operatively coupled to the wireless circuitry and to the button control, wherein the controller is configured to process audio content received from the wireless circuitry and deliver the processed audio content to the audio driver for output through the nozzle, and wherein the controller is further configured to initiate a pairing operation in response to the button control;

a battery disposed in the device housing and configured to provide power to circuitry within the device housing; and a plurality of electrical contacts disposed along a surface of the device housing and electrically coupled to the battery to enable the battery to be charged from an external power source.

14. The wireless in-ear headphone set forth in claim 13 further comprising an elastomeric boot coupled between the nozzle and the device housing.

15. The wireless in-ear headphone set forth in claim 14 wherein the elastomeric boot accommodates relative motion between the nozzle and the device housing.

16. The wireless in-ear headphone set forth in claim 13 wherein the audio driver is disposed within the device housing and aligned to emit sound through the audio port is a first audio driver and wherein the wireless in-ear headphone further comprises a second audio driver disposed within the device housing.

17. The wireless in-ear headphone set forth in claim 16 wherein the first audio driver is a high frequency audio driver and the second audio driver is a low frequency audio driver.

18. A wireless in-ear headphone comprising:

a device housing that defines an interior cavity;

a nozzle extending away from the device housing and defining an audio port that opens to the interior cavity;

an audio driver disposed within the device housing and aligned to emit sound through the audio port;

a first microphone aligned to detect sound emitted from a user's mouth when the wireless in-ear headphone is worn within an ear of the user;

a second microphone positioned along an exterior surface of the device housing;

an active noise cancellation system configured to generate destructive interference waves to counter audio picked up by the second microphone;

a wireless antenna and wireless circuitry disposed within the device housing, the wireless circuitry configured to establish a wireless communication link with a host device over the wireless antenna;

a button control disposed at an exterior surface of the device housing and configured to receive a user input;

a controller disposed within the device housing and operatively coupled to the wireless circuitry and the button control, wherein the controller is configured to process audio content received from the wireless circuitry and deliver the processed audio content to the audio driver for output through the nozzle, and wherein the controller is further configured to perform a task on the in-ear headphone in response to the button control; and a battery disposed in the device housing and configured to provide power to circuitry within the device housing; and a plurality of electrical contacts disposed along a surface of the device housing and electrically coupled to the battery to enable the battery to be charged from an external power source.

19. The wireless in-ear headphone set forth in claim 18 further comprising a plurality of sensors disposed within the device housing, the plurality of sensors including an accelerometer and a proximity sensor.

20. The wireless in-ear headphone set forth in claim 18 further comprising a directional microphone aligned to detect sound emitted from the user's mouth when the wireless in-ear headphone is worn within an ear of the user.

* * * * *